United States Patent
Nehter

(10) Patent No.: US 10,411,277 B2
(45) Date of Patent: Sep. 10, 2019

(54) GAS CIRCUIT FOR A SOLID OXIDE FUEL CELL SYSTEM AND A SOLID OXIDE FUEL CELL SYSTEM

(71) Applicant: ThyssenKrupp Marine Systems GmbH, Kiel (DE)

(72) Inventor: Pedro Nehter, Heikendorf (DE)

(73) Assignee: THYSSENKRUPP MARINE SYSTEMS GMBH, Kiel (DE)

( * ) Notice: Subject to any disclaimer, the term of this patent is extended or adjusted under 35 U.S.C. 154(b) by 272 days.

(21) Appl. No.: 15/103,250

(22) PCT Filed: Dec. 15, 2014

(86) PCT No.: PCT/EP2014/003350
§ 371 (c)(1),
(2) Date: Jun. 9, 2016

(87) PCT Pub. No.: WO2015/090549
PCT Pub. Date: Jun. 25, 2015

(65) Prior Publication Data
US 2016/0315335 A1  Oct. 27, 2016

(30) Foreign Application Priority Data
Dec. 17, 2013  (DE) .......................... 10 2013 226 327

(51) Int. Cl.
*H01M 8/04* (2016.01)
*H01M 8/04089* (2016.01)
(Continued)

(52) U.S. Cl.
CPC ... *H01M 8/04097* (2013.01); *H01M 8/04089* (2013.01); *H01M 8/0618* (2013.01); *H01M 2008/1293* (2013.01)

(58) Field of Classification Search
CPC . H01M 8/04; H01M 8/04089; H01M 8/04097
See application file for complete search history.

(56) References Cited

U.S. PATENT DOCUMENTS

2004/0062973 A1* 4/2004 Agnew ............ H01M 8/04022
429/423
2005/0106429 A1* 5/2005 Keefer ............. H01M 8/04097
429/410
(Continued)

FOREIGN PATENT DOCUMENTS

CA         2452990 A      6/2004
DE  10 2012 218 648 A1   4/2014
(Continued)

OTHER PUBLICATIONS

Machine Translation of: JP 2006/100223A, Koga et al., Apr. 13, 2006.*
(Continued)

*Primary Examiner* — Kenneth J Douyette
(74) *Attorney, Agent, or Firm* — Thyssenkrupp North America, Inc.

(57) ABSTRACT

A gas circuit for a solid oxide fuel cell system may comprise an anode gas segment in which an anode gas exiting from a gas space of an anode of a solid oxide fuel cell flows, a recirculation segment for recirculating at least a part of the anode gas back to a combustion gas processing appliance arranged in the gas circuit and in which fuel is processed to combustion gas for the solid oxide fuel cell, wherein a conveying appliance for recirculating the anode gas, and a division appliance that divides the anode gas into a recirculation stream and a residual gas stream to be discharged from the gas circuit, are arranged in the gas circuit, wherein the conveying appliance is arranged upstream of the division appliance in the anode gas segment. The present disclosure further relates to a solid oxide fuel cell system having a gas circuit.

9 Claims, 2 Drawing Sheets

(51) Int. Cl.
  *H01M 8/06*    (2016.01)
  *H01M 8/0612*  (2016.01)
  *H01M 8/124*   (2016.01)

(56) References Cited

U.S. PATENT DOCUMENTS

2008/0057361 A1    3/2008  Moon et al.
2010/0015481 A1*   1/2010  Kanao .................. H01M 8/002
                                                      429/456
2012/0214076 A1    8/2012  Hakala

FOREIGN PATENT DOCUMENTS

| EP | 1 187 241 B1 | 3/2002 |
| EP | 1 571 726 A1 | 9/2005 |
| EP | 1 603 181 A2 | 12/2005 |
| JP | 2006 100223 A | 4/2006 |
| WO | 2013/087378 A2 | 6/2013 |

OTHER PUBLICATIONS

English language Abstract of JP 2006 100223 A, Apr. 13, 2006.
English language Abstract of DE 10 2012 218 648 A1, Oct. 12, 2012.
International Search Report for PCT/EP2014/003350 dated Mar. 31, 2015 (dated Apr. 9, 2015).

* cited by examiner

GAS CIRCUIT FOR A SOLID OXIDE FUEL CELL SYSTEM AND A SOLID OXIDE FUEL CELL SYSTEM

CROSS REFERENCE TO RELATED APPLICATIONS

This application is a U.S. National Stage Entry of International Patent Application Serial Number PCT/EP2014/003350, filed Dec. 15, 2014, which claims priority to German Patent Application No. DE 102013226327.9 filed Dec. 17, 2013, the entire contents of both of which are incorporated herein by reference.

FIELD

The present disclosure relates to gas circuits for solid oxide fuel cell systems and to solid oxide fuel cell systems having one or more solid oxide fuel cells.

BACKGROUND

Solid oxide fuel cells (SOFCs) can be designed as high-temperature or else low-temperature fuel cells and are subdivided, depending on their type, primarily into tubular and planar solid oxide fuel cells. Planar solid oxide fuel cells are suitable, especially, for applications with high volumetric power densities. However, the reliability and service life of planar solid oxide fuel cells can be highly impaired at high pressure differences between the air side (cathode) and the surroundings, and also between the fuel side (anode) and the air side, which can be due, for example, to downstream-connected heat exchangers.

In the use of hydrocarbonaceous fuels such as, for example, natural gas, LPG, diesel or kerosene, processing of the combustion gas is necessary in order to avoid carbon deposits within the solid oxide fuel cell. Steam reforming, in addition to partial oxidation and autothermal reforming, here is the processing method having the highest potential activity. In this case, in addition to the steam which must be provided for the actual reforming of the fuel, gases such as hydrogen, carbon monoxide and carbon dioxide are advantageous in that they can generate methane via an exothermic reaction within the reformer. Since the reformate is customarily not completely oxidized in the solid oxide fuel cell, in the prior art, it is known to recirculate the gas exiting from the anode back to the reformer in a gas circuit, in order to provide the abovementioned gases hydrogen, carbon monoxide and carbon dioxide that support the processing process.

Typically, for the recirculation of the anode gas in the gas circuit, a blower or an ejector is used, through which, the recirculated material or a mixture of recirculated material and primary fuel flows.

For example, EP 1 603 181 A2 discloses a solid oxide fuel cell system in which the anode gas stream is divided before the blower.

In US 2008/0057361, an arrangement is additionally described in which the recirculation blower of the air side is situated in the recirculated material line and therefore is likewise situated downstream of the division of the anode stream into a residual gas stream and a recirculation stream.

In these SOFC system configurations known from the prior art, the pressure level of the anode, however, is set correspondingly high above the pressure drops of the downstream components of the residual gas stream. In this case, the gas pressure at the anode can reach such a high level that damage to, or failure of, the fuel cell can occur.

DETAILED DESCRIPTION

Figure 1:
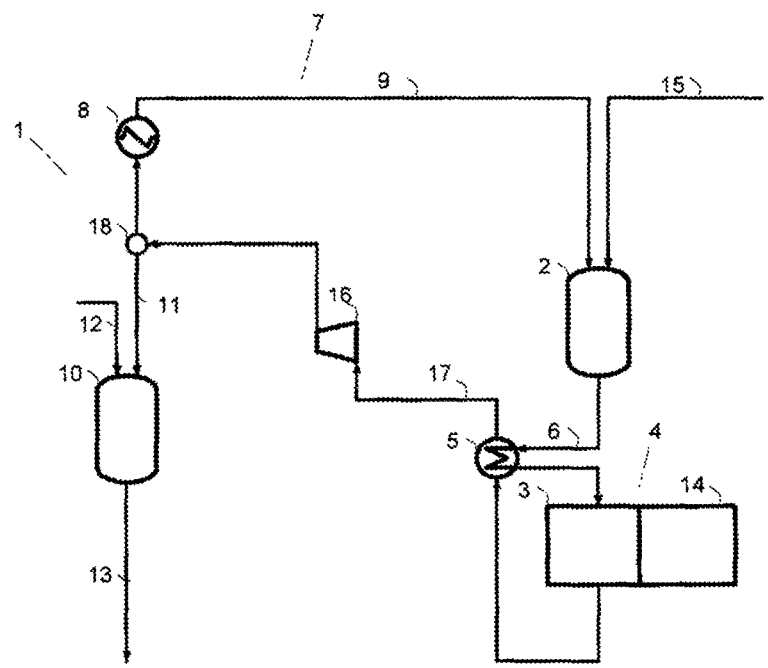
FIG. 1 is a schematic view of an example solid oxide fuel cell system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

One example object of the present disclosure is to provide a gas circuit for a solid oxide fuel cell system, and also a solid oxide fuel cell system, according to which recirculation is permitted, without the pressure being disproportionately increased in the gas space of the anode.

Therefore, according to the invention a gas circuit is provided for a solid oxide fuel cell system, which comprises an anode gas segment in which an anode gas exiting from a gas space of an anode of the solid oxide fuel cell flows, and a recirculation segment for recirculating at least a part of the anode gas back to a combustion gas processing appliance arranged in the gas circuit and in which fuel is processed to combustion gas for the solid oxide fuel cell, wherein a conveying appliance for recirculating the anode gas, and a division appliance that divides the anode gas into a recirculation stream and a residual gas stream to be discharged from the gas circuit, are arranged in the gas circuit, wherein the conveying appliance is arranged upstream of the division appliance in the anode gas segment.

The basic concept of the present invention is to arrange the conveying appliance upstream of the division appliance in the anode gas segment. By dividing the anode gas stream first downstream of the conveying appliance, the entire gas stream exiting from the anode gas space flows through the conveying appliance. In this case, the pressure level in the gas space of the anode can be kept low, despite high pressure drops in the residual gas stream. The power consumption of the conveying appliance will be higher in this case compared with the customary anode gas recirculation known from the prior art, since the volumetric flow rate can double. This however becomes noticeable in the electrical efficiency only with a decrease of a maximum of 1%.

According to a preferred embodiment, the gas conveying appliance is a blower.

According to an alternative preferred embodiment, the gas conveying appliance can alternatively be an ejector.

Preferably, the combustion gas processing appliance comprises a reformer in which the processing of the combustion gas is carried out.

Furthermore, it is advantageous when the combustion gas processing appliance is designed to carry out the combustion gas processing at differing temperatures, at differing pressures and/or using differing catalysts.

In addition, the combustion gas processing appliance can comprise appliances for carrying out partial oxidation, an autothermal reforming or a steam reforming.

According to a preferred embodiment, the combustion gas processing appliance comprises a desulfurizing appliance, in such a manner that sulfur-containing fuels can also be used.

It is also advantageous when the residual gas stream is feedable to a residual gas burner for oxidizing the residual gas with air or oxygen.

Preferably, the gas circuit additionally comprises a combustion gas segment which leads from the combustion gas appliance to the gas space of the anode.

According to the invention, in addition, a solid oxide fuel cell system is provided which comprises at least one solid oxide fuel cell and a gas circuit as detailed above. The solid oxide fuel cell system according to the invention which is equipped with a gas circuit as described above has the advantage of a high reliability and long service life, since large pressure differences and/or an excessive pressure rise in the gas space of the anode are avoided.

FIG. 1 shows the schematic structure of a solid oxide fuel cell system 1 having the gas circuit according to an embodiment, which can be operated, for example, with hydrocarbon-containing fuels such as natural gas, LPG, diesel, gasoline, kerosene, methanol or ethanol at an operating temperature between 500° C. and 900° C. The solid oxide fuel cell system 1 may comprise a combustion gas processing appliance 2 in the form of a reformer which is coupled to an anode 3 of a solid oxide fuel cell 4 via a combustion gas segment 6 of the gas circuit 7. The combustion gas processing appliance 2 may be designed to operate at temperatures from 250° C. to 1000° C., heated, cooled or adiabatically. Fuel is fed to the combustion gas processing appliance 2 for processing via a fuel segment 15.

The solid oxide fuel cell 4 may be designed as a low-temperature or high-temperature fuel cell that is proton- or oxygen-conducting. In addition, the solid oxide fuel cell 4 can consist on the gas side of a plurality of series- or parallel-connected cells or cell stacks which are not shown here in detail. The cathode 14 of the solid oxide fuel cell 4 may be arranged next to the anode 3, separated from the anode 3 by a solid, for example ceramic, electrolyte.

The solid oxide fuel cell system 1, in addition, may have a heat exchanger 5 through which combustion gas that has been processed by the combustion gas processing appliance 2 in the combustion gas segment 6 of the gas circuit 7 of the solid oxide fuel cell system 1 is passed on the way to the anode 3, and a further heat exchanger 8 which is arranged in a recirculation segment 9 of the gas circuit 7, in which recirculated material flows, and which heat exchanger brings the gas to the required intake temperature of the reformer 2 and the solid oxide fuels 4.

In addition, the solid oxide fuel cell system 1 comprises an oxidation unit 10 may have a residual gas burner. The oxidation unit 10 is arranged in a residual gas segment 11 in which residual gas that is to be discharged from the gas circuit 7 flows. The residual gas is fed together with air 12 to the oxidation unit 10 in order to oxidize the residual gas and discharge it as off-gas 13 from the oxidation unit 10.

To avoid a pressure rise in the gas space of the anode 3, a gas conveying appliance 16, which is here constructed as a blower, and which serves for recirculating a part of the anode gas which exits from the anode 3, may be arranged in an anode gas segment 17, in such a manner that the entire anode gas flows through the gas conveying appliance 16. Downstream of the gas conveying appliance 16, a division appliance 18 may be arranged, for example designed as a valve, which divides the anode gas into a recirculation stream which flows in the recirculation segment 9, and a residual gas stream which is to be discharged from the gas circuit, which flows in the residual gas segment 11.

Figure 2:
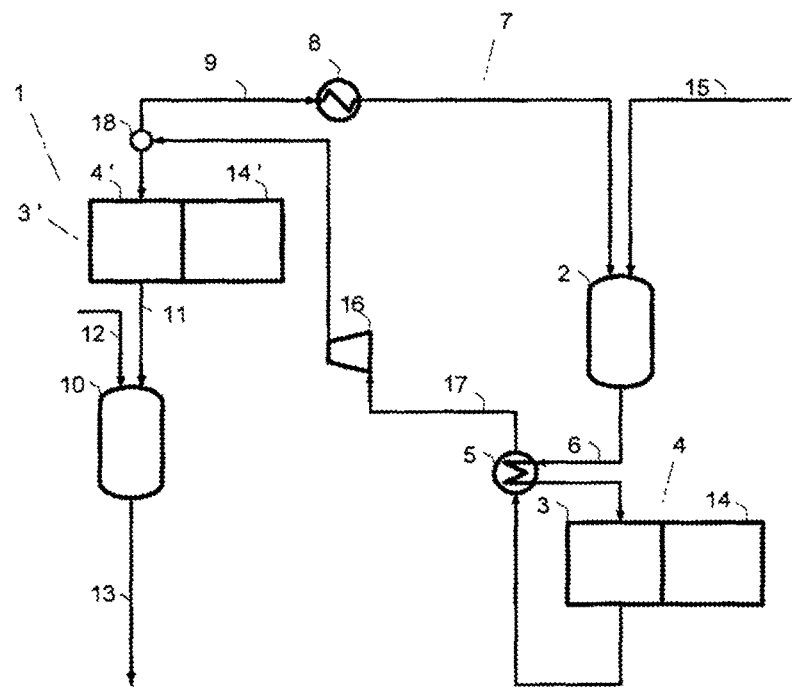
FIG. 2 is a schematic view of another example solid oxide fuel cell system.

FIG. 2 shows the schematic structure of a solid oxide fuel cell system 1 as claimed in a second embodiment, which differs from the embodiment shown in FIG. 1 in that a further solid oxide fuel cell 4' may be arranged in the residual gas segment 11 upstream of the oxidation unit 10 and downstream of the division appliance 18. More than one further solid oxide fuel cell can also be arranged in this segment. By providing one or more additional solid oxide fuel cells 4' in the residual gas segment 11, the fuel conversion rate is increased.

Figure 3:
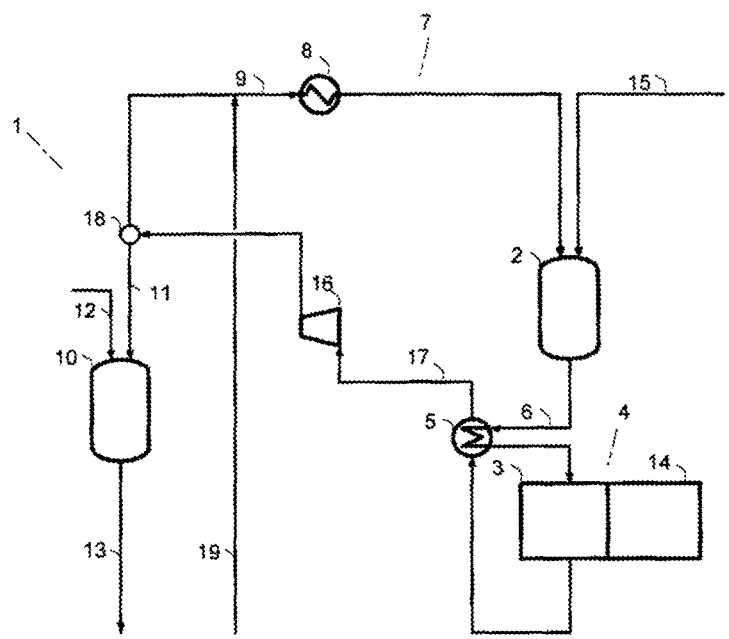
FIG. 3 is a schematic view of still another example solid oxide fuel cell system.

FIG. 3 shows the schematic structure of a solid oxide fuel cell system 1 as claimed in a further embodiment, which differs from the embodiment shown in FIG. 1 in that a further medium, such as water, for example, or steam, may be fed to the recirculation stream in the recirculation segment 9 via a line 19 opening out into the recirculation segment 9 by means of an ejector which is not shown here, a nozzle or a jet scrubber.

Figure 4:
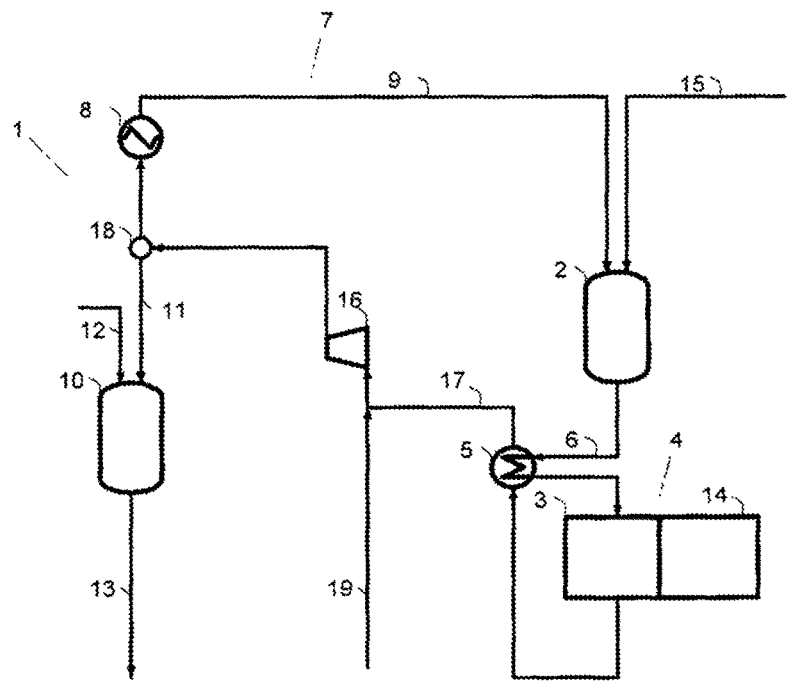
FIG. 4 is a schematic view of a further example solid oxide fuel cell system.

FIG. 4 shows the schematic structure of a solid oxide fuel cell system 1 as claimed in yet a further embodiment which differs from the embodiment shown in FIG. 3 in that the further medium, such as, e.g., water or steam, may be already introduced into the anode gas segment 17, i.e. downstream of the anode 3, and upstream of the gas conveying appliance 16.

What is claimed is:

1. A gas circuit for a solid oxide fuel cell system, the gas circuit comprising:
    an anode gas segment in which an anode gas exiting from a gas space of an anode of a solid oxide fuel cell flows;
    a reformer in which fuel is processed to combustion gas for the solid oxide fuel cell in the solid oxide fuel cell system; and
    a recirculation segment that recirculates at least a portion of the anode gas, as a recirculation stream, back to the reformer, wherein the recirculation segment comprises:
        a division appliance that divides the anode gas into the recirculation stream and a residual gas stream to be discharged, and
        a conveying appliance for recirculating the anode gas, wherein the conveying appliance is positioned upstream of the division appliance in the anode gas segment; and
    wherein the recirculation segment is in fluid communication with a line through which one or both of water or steam is fed to the recirculation stream in the recirculation segment downstream of the anode and upstream of the gas conveying appliance by way of an ejector, a nozzle, or a jet scrubber.

2. The gas circuit of claim 1 wherein the conveying appliance is a blower.

3. The gas circuit of claim 1 wherein the conveying appliance is an ejector.

4. The gas circuit of claim 1 wherein the reformer is configured to perform combustion gas processing with at least one of differing temperatures, differing pressures, or differing catalysts.

5. The gas circuit of claim 1 wherein the reformer comprises appliances for performing partial oxidation, autothermal reforming, or steam reforming.

6. The gas circuit of claim 1 wherein the reformer comprises a desulfurizing appliance.

7. The gas circuit of claim 1 wherein the solid oxide fuel cell system comprises an oxidation unit having a residual gas burner for oxidizing residual gas with air or oxygen.

8. The gas circuit of claim 1 further comprising a combustion gas segment that leads from the reformer to the gas space of the anode.

9. A solid oxide fuel cell system that comprises at least one solid oxide fuel cell and a gas circuit as recited in claim 1.

\* \* \* \* \*